United States Patent [19]

Aeschlimann

[11] Patent Number: 4,681,433

[45] Date of Patent: Jul. 21, 1987

[54] METHOD AND APPARATUS FOR MEASURING RELATIVE POSITION

[75] Inventor: Heinz Aeschlimann, Aarau, Switzerland

[73] Assignee: Kern & Co. AG., Aarau, Switzerland

[21] Appl. No.: 230,685

[22] Filed: Feb. 2, 1981

Related U.S. Application Data

[63] Continuation-in-part of Ser. No. 57,194, Jul. 13, 1979, abandoned.

[30] Foreign Application Priority Data

Jul. 20, 1978 [CH] Switzerland ............... 7819/78

[51] Int. Cl.⁴ .................. G01C 3/08; G01B 11/26
[52] U.S. Cl. .............................. 356/5; 356/4;
356/141; 356/152; 455/603; 455/605
[58] Field of Search .............. 455/600, 603–606;
356/4, 5, 141, 152, 28.5

[56] References Cited

U.S. PATENT DOCUMENTS

| 3,315,257 | 4/1967 | Sauberlich | 343/12 |
|---|---|---|---|
| 3,680,958 | 8/1972 | Von Bose | 356/4 |
| 3,874,087 | 4/1975 | Nunlist | 33/275 |
| 3,893,772 | 7/1975 | Tilly et al. | 356/152 |
| 4,007,991 | 2/1977 | Robertsson | 356/152 |
| 4,068,951 | 1/1978 | Froome et al. | 356/5 |
| 4,096,380 | 6/1978 | Eichweber | 455/605 |
| 4,113,381 | 9/1978 | Epstein | 356/152 |
| 4,113,382 | 9/1978 | Freudenschuss | 356/5 |
| 4,136,955 | 1/1979 | Aeschlimann et al. | 356/152 |

OTHER PUBLICATIONS

Aga, Geodimeter 700 (brochure), Mar. 2, 1972, 356-5.

Primary Examiner—Stephen C. Buczinski
Attorney, Agent, or Firm—Michael E. Zall

[57] ABSTRACT

For simplification of storage of measured range and direction values in surveying, as well as for coordination and processing of these values with additional information these values are transmitted from the measuring station (1,2) to the target point (2'). The additional information is mainly obtained at the target point (2') at a distance from the measuring station (1,2) and at the other end of the measured range, whereas the measured values are transmitted by modulating electric signals upon the infrared beam of an electrooptic range-finder (2) or by means of a separate short wave link. At the target point (2') there are a signal receiver and a programmable data storage device (3) which accepts the additional information keyed in by hand via a keyboard (17).

Advantages are obtained by this method in simplifying the observer's task and preparation of reports, providing automatic data transmission and therefore reducing reading and transmission errors.

6 Claims, 5 Drawing Figures

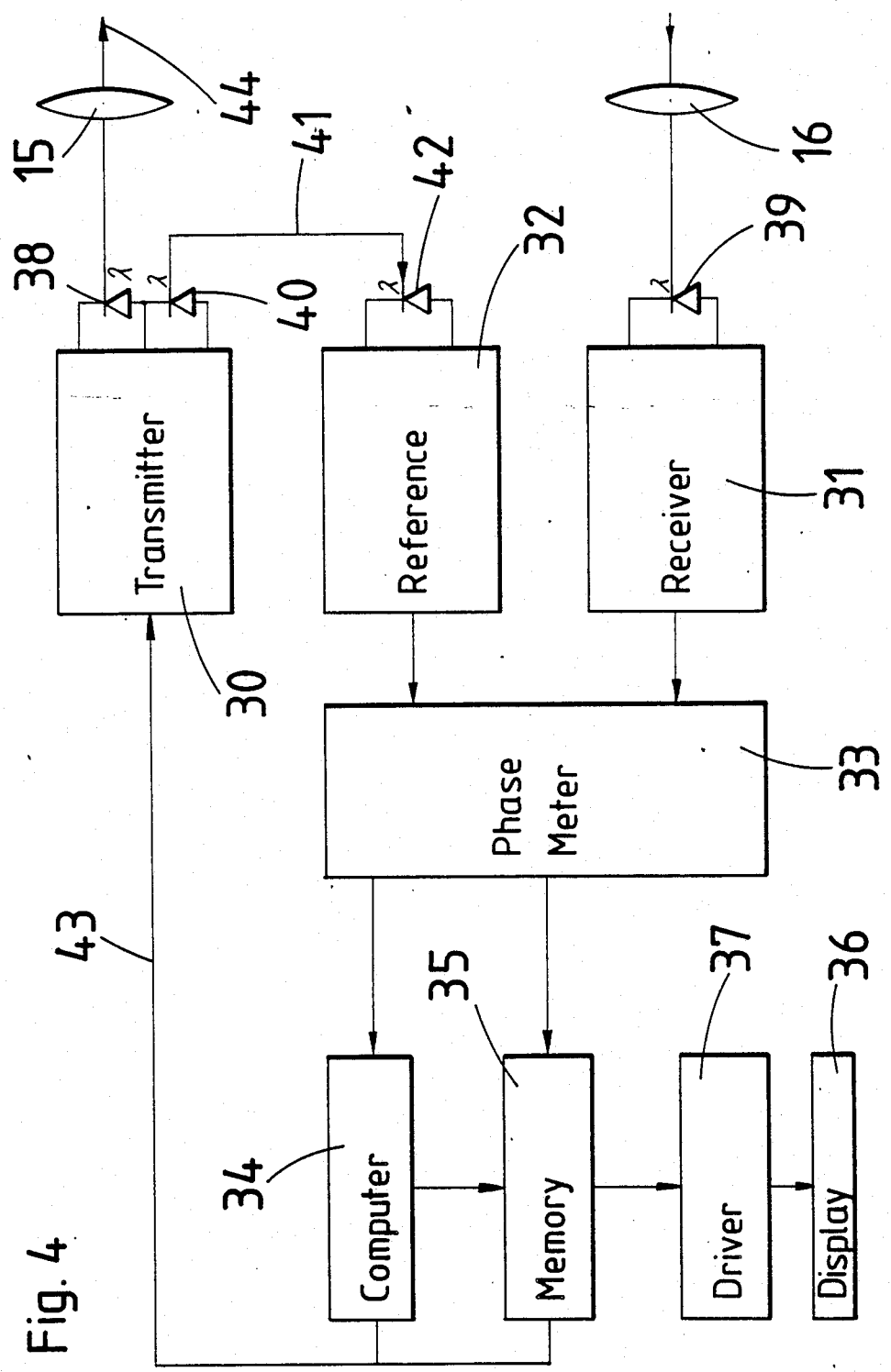

4,681,433

METHOD AND APPARATUS FOR MEASURING RELATIVE POSITION

RELATED APPLICATIONS

This is a continuation-in-part application of Ser. No. 057,194 filed July 13, 1979 now abandoned, the entire disclosure of which is incorporated herein by reference.

BACKGROUND OF THE INVENTION

1. Field of the Invention

This invention relates in general to measuring apparatus and method such as, for example, in field and land surveying and cadastral surveying. For example in cadastral surveying information on position of points must be coordinated and stored together with additional information about the type of point, although the invention is not to be limited to these particular applications.

2. Description of the Prior Art

In surveying with determination of the position of points in the field by means of optical aiming and distance measuring apparatus the observer must prepare for each aiming a data block comprising all necessary measured values and all required additional (or auxiliary) information. According to the state of the Art the additional information about the target point must be transmitted by the aid to the observer by means of radio or voice contact. If more than a few aids are involved at different target points this information exchange presents an additional job for the observer, in particular in case of radio communication, that must be done by a separate operator if a certain limit is reached.

An object of the present invention is, therefore, to provide a method and an apparatus for measuring the relative position of points which reduce communication work for the observer as well as the probability of transmission errors.

The foregoing objects, other objects as well as the numerous advantages of the present invention are set forth in the following disclosure.

SUMMARY OF THE PRESENT INVENTION

The present invention comprises apparatus and a method for measuring the relative position of a first point and one or more second points wherein distances and directions are transmitted between the points by modulating electromagnetic waves. These waves may be those used for electrooptical distance measurement. Means at the second point may be used for coordination and storage of distance and directions between the points and additional information.

In one embodiment means for measuring distance, directions and for data coordination and storage are each separate, capable of functioning independently but all together constituting a modular system of units that may be functionally and bodily combined with each other.

Other objects, features and advantages of the present invention will be apparent from the following detailed description of certain preferred embodiments thereof when taken in conjunction with the accompanying drawings.

BRIEF DESCRIPTION OF THE DRAWINGS

In the accompanying drawings:

FIG. 4 is a block diagram of a range-finder and data transmission module; and

DESCRIPTION OF THE PREFERRED EMBODIMENTS

Figure 1:
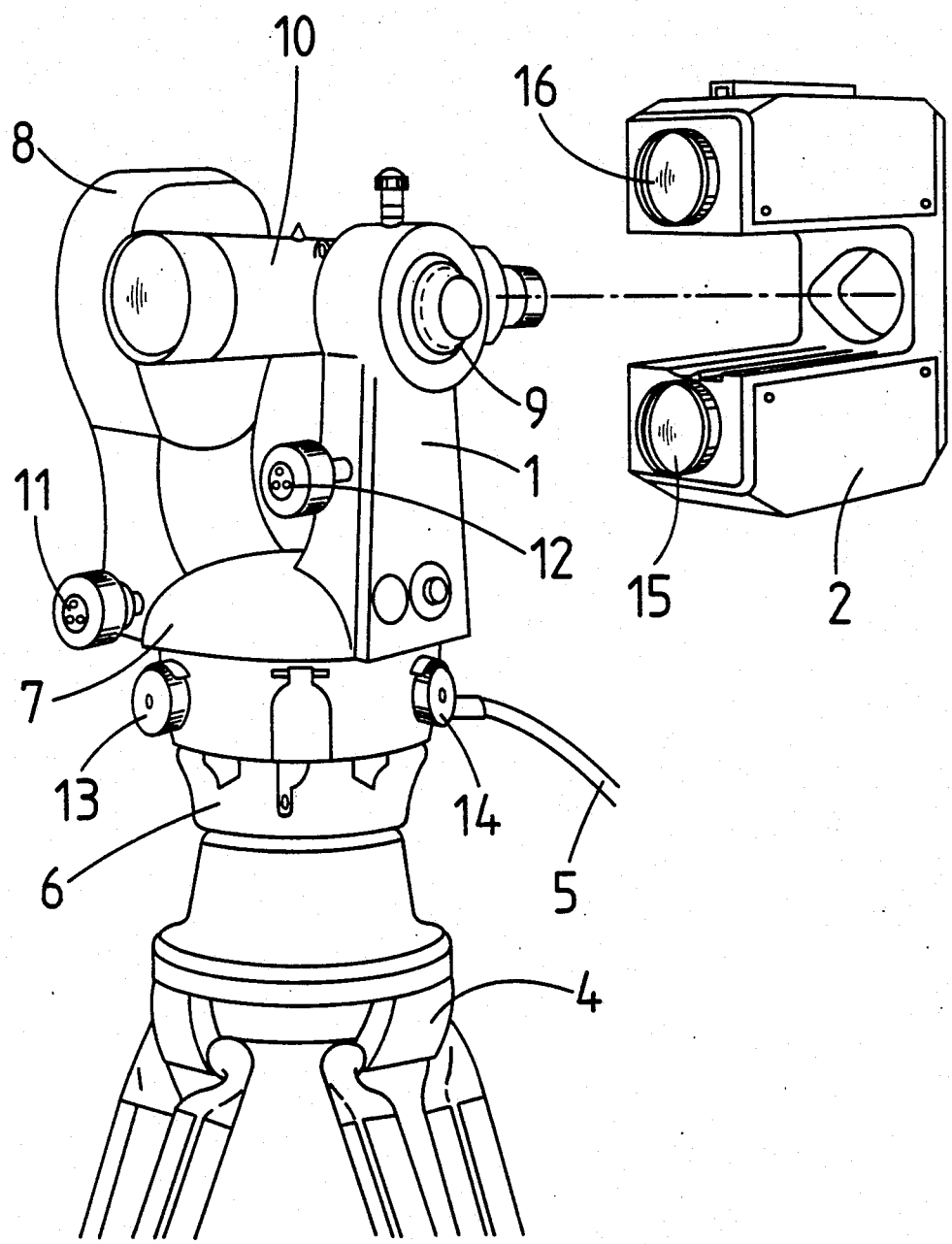
FIG. 1 illustrates a modular tacheometer system to obtain and transmit positional information.
Figure 2:
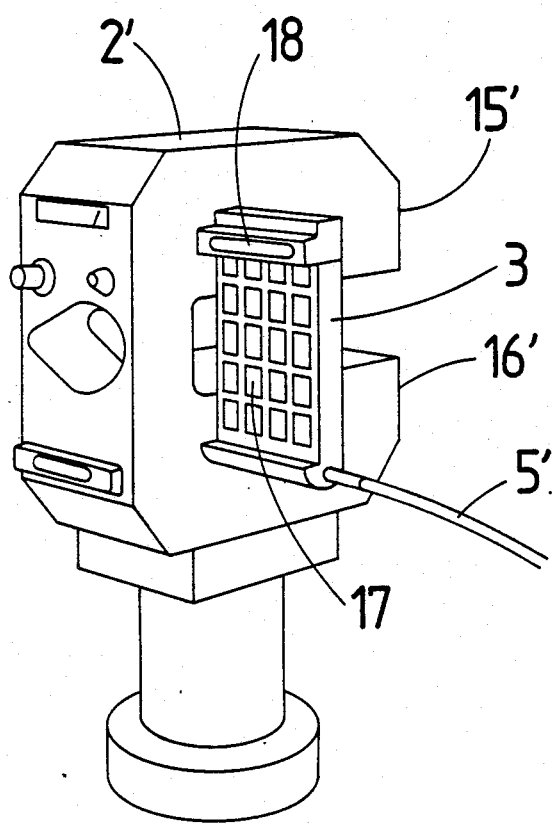
FIG. 2 illustrates a remote station with storage means for the system according to FIG. 1.

A system according to the present invention for data acquisition in the field as illustrated in FIG. 1 and FIG. 2 comprises three main components: A theodolite 1 with automatic digital display of measured values, an electrooptical range-finder 2 that also may be used as an active remote station 2' and a data storage means 3. These components may be combined with one another as required; as shown in FIG. 1 the range-finder 2 is slid on to the theodolite 1 for measurement. The data sotrage means 3 as shown in conjunction with the remote station in FIG. 2 may also be attached to the theodolite at the measuring station according to FIG. 1.

For registration of the measured values and additional data with the computer compatible data storage means 3 the ranger-finder 2 as well as the theodolite 1 provide the measured values automatically in digital form. Apparatus of this kind is known as disclosed in U.S. Pat. No. 3,874,087 of Nünlist, U.S. Pat. No. 4,136,955 of Aeschlimann et al. and Publication AGA, Geodimeter Model 700 (Brochure), Mar. 2, 1972, to which reference is made for detailed description. The entire disclosures of the aforementioned references are incorporated herein by a reference. The data storage means 3 comprises a semiconductor memory with an integrated microcomputer for control of an interrogation system to acquire additional information, for storing the complete data blocks, for control of a search and display system for the stored data, and for transfer of these data to a computer of known type.

The measuring station as shown in FIG. 1 is set up at a first survey point, within the terrain. This is done by means of a known tripod 4 onto which is mounted a theodolite 1 with electronic acquisition and output of horizontal direction and angle of elevation. An electric cable 5 is provided to supply power to the fixed base 6 of theodolite 1. The upperpart 7 with standards 8 and 9 for the vertically tiltable aiming telescope 10 is mounted upon the base 6 with a horizontally rotatable bearing. Pointing screws 11 and 12 are provided for setting the horizontal direction and the elevation angle of the telescope 10, screws 13, 14 and a third one hidden behind the instrument for levelling base 6 upon tripod 4.

A U-shaped electrooptical range-finder 2 shown to the right side of aiming telescope 10 is slid onto the telescope 10 for measurement so that it is pointed likewise to the remote station 2' at a second point of the terrain. Electric power is fed to the range-finder 2 via contact blades and pins from the telescope 10. Infrared modulated waves with a wavelength of 0,9 $\mu$m are transmitted to the second point via a transmitting lens 15. A wave length between 100 $\mu$m and 1 $\mu$m may be utilized.

The range-finder and data transmission module 2, as illustrated in FIG. 4 comprises an optical transmission and reception system 15, 16, a transmitter 30, a receiver 31 and reference receiver 32, a phase meter 33, a computer 34 with memory 35 and a display 36 with driver 37. The optical system guides the light of a light emitting transmitter diode 38 modulated by transmitter 30 via transmitter lens 15 and the measured path to the remote station 2'. From station 2' modulated light is received and focussed on to a receiver diode 39 by receiver lens 16. The output of receiver diode 39 is processed electrically by receiver unit 31.

Transmitter unit 30 drives also a second light emitting diode 40. Therefrom light is conducted over a short light conductor 41 to reference receiver 32 via a diode 42 (reference path). A 14.9854 MHz oscillator of transmitter 30 generates the modulation frequency for diodes 38, 40. A frequency divider is provided for 100:1 division to 149.854 kHz. Thus the diodes 38, 40 may transmit infrared light modulated at about 15 MHz or 150 kHz upon command via a data line 43 from computer 34 and memory 35. Line 43 may be a light conductor for avoiding interference from transmitter 30 to data processing stages 34, 35.

The electrical output of diodes 39, 42 is preamplified and down-converted to 150 kHz in case of the 15 MHz signals. Frequency selective amplifiers of stages 31, 32 pass only the 150 kHz intermediate frequency signals. The phase difference of these 150 kHz signals is counted by phase meter 33 by means of a clock frequency gated by a bistable and a gate. The count result is stored in memory 35 successively for the modulation frequencies 15 MHz and 150 kHz commanded by a program of computer 34 via line 43. A zero reference for the phase count is provided by measurement over a short path (not shown) which short circuits output of diode 38 directly to receiver diode 39 in a way well known in the art.

The distance corresponding to the count stored in memory 35 is displayed at display 36, which is fed from memory 35 via driver 37. After completion of each distance measurement cycle the distance result is fed from memory 35 in a binary code on command line 43, which effects optical data transmission from diode 38 to remote station 2'. A 15 MHz modulation may represent a high signal condition and a 150 kHz modulation a low one. Directional measurement results provided by the theodolite 1 in digital form are also stored in memory 35 and transmitted optically to the remote station 2' as described above.

Figure 5:
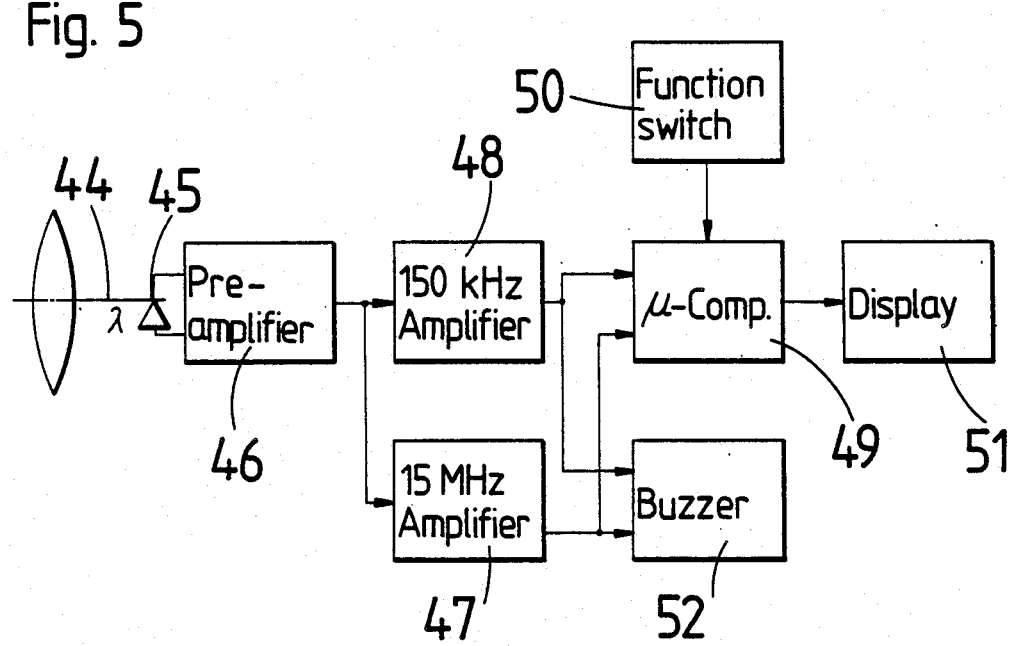
FIG. 5 is a block diagram interface for a receiver module.

The remote station 2' comprises a data receiving interface as shown in FIG. 5. The optical beam 44 is received by a diode 45 and the data are amplified by a preamplifier 46. The 15 MHz signals are separated and amplified by a selective amplifier 47 and the 150 kHz signals by a selective amplifier 48. These binary coded data signals are decoded and stored by a microcomputer 49. Upon operation of a function switch 50 for selection of the type of measurement (distance, direction, etc.) results, the respective data is fed to and displayed by a display 51. A buzzer 52 is provided to monitor the process of data reception via optical beam 44 from data transmission module 2.

In case of data transmission by a separate short wave link the data on command line 43 are fed to a separate SW-transmitter, and light sensitive diode 45 on each remote station 2' is replaced by a SW-data receiver adapted to the SW-transmitter. A gate is provided which is fed by each SW-receiver output as well as from light sensitive diode 45. Thus data reception is activated only at that remote station receiving the optical distance measuring beam, and erroneous data reception by other remote stations is avoided.

At the second point the remote station 2' (see FIG. 2), which is of the same construction as the range-finder 2, receives the infrared waves via its receiver lens 16', amplifies and beams them back to the first survey point via a transmitting lens 15' without introducing any change in wavelength or phase of modulation. As known in the art the remote station 2' can also be replaced by a cube corner reflector, though in this case the waves are retrobeamed without amplification and the intensity and aperture angle of the reflected beam depend on good condition of the reflector.

Remodulating and phaselocking the infrared beam by remote station 2' is conventional and could be well effected by the slave station disclosed in FIG. 1 of U.S. Pat. No. 4,068,951 of Froome etal., the entire disclosure of which is incorporated herein by reference. As no additional modulation, as used by Froome etal.; is required by the invention the modulating cavity $C_s$ described in column 3, lines 1–13 of U.S. Pat. No. 4,068,951 with associated oscillator of frequency $f_s$ may be left out, and photo-detector $PD_s$ controls laser $L_s$ via a HT generator simply with the modulating frequency received from the range-finder 2.

The reflected waves are received again by the range-finder 2 via a receiving lens 16. The range between first and second points is obtained from the transmitted and from the received modulated waves in form of electric signals by means of an electronic phase evaluation circuit integrated in the range-finder in a known manner as disclosed in U.S. Pat. No. 3,874,087 of Nünlist.

The range-finder 2 as described above, may be switched for function as an active remote station 2'. If one or more cube corner reflectors are used at the second point, this function is of course superfluous. A measuring system according to the present invention, on the other hand comprises a range-finder 2 with means for transmission to the remote station 2' of the electric signals representing distance and directional values by additional modulation of the infrared waves serving for distance measurement. At the second point these measured values are likewise received and converted again into electric signals by the receiver 16' of the remote station, the signals then being stored in the data storage means 3. For transmission error checking at the first survey point by comparison of data, also the remote station 2' is suitably equipped with means for retransmission of measured values to the measuring station 2 via the measuring beam. The distances and directions transmitted to the second point may be compared with positional information stored in a memory for setting out the second point. If, however, transmission of distance or directional data is provided by means of electromagnetic waves in the one meter wavelength range and independent of the measuring beam according to another embodiment of the invention, a feedback data transmission may be omitted because of the increased reliability of transmission. If a set of various second points is involved, a separate data storage means 3 may be provided with each of the second points. In this case, the distance and directional data transmitted by shortwaves from the measuring station 2 reaches all the storage means 3, although it must be evaluated by one means 3 at time. Thus the respective one means 3 may be activated for evaluation by reception of the distance measuring beam directed only to the respective one data storage means 3.

Figure 3:
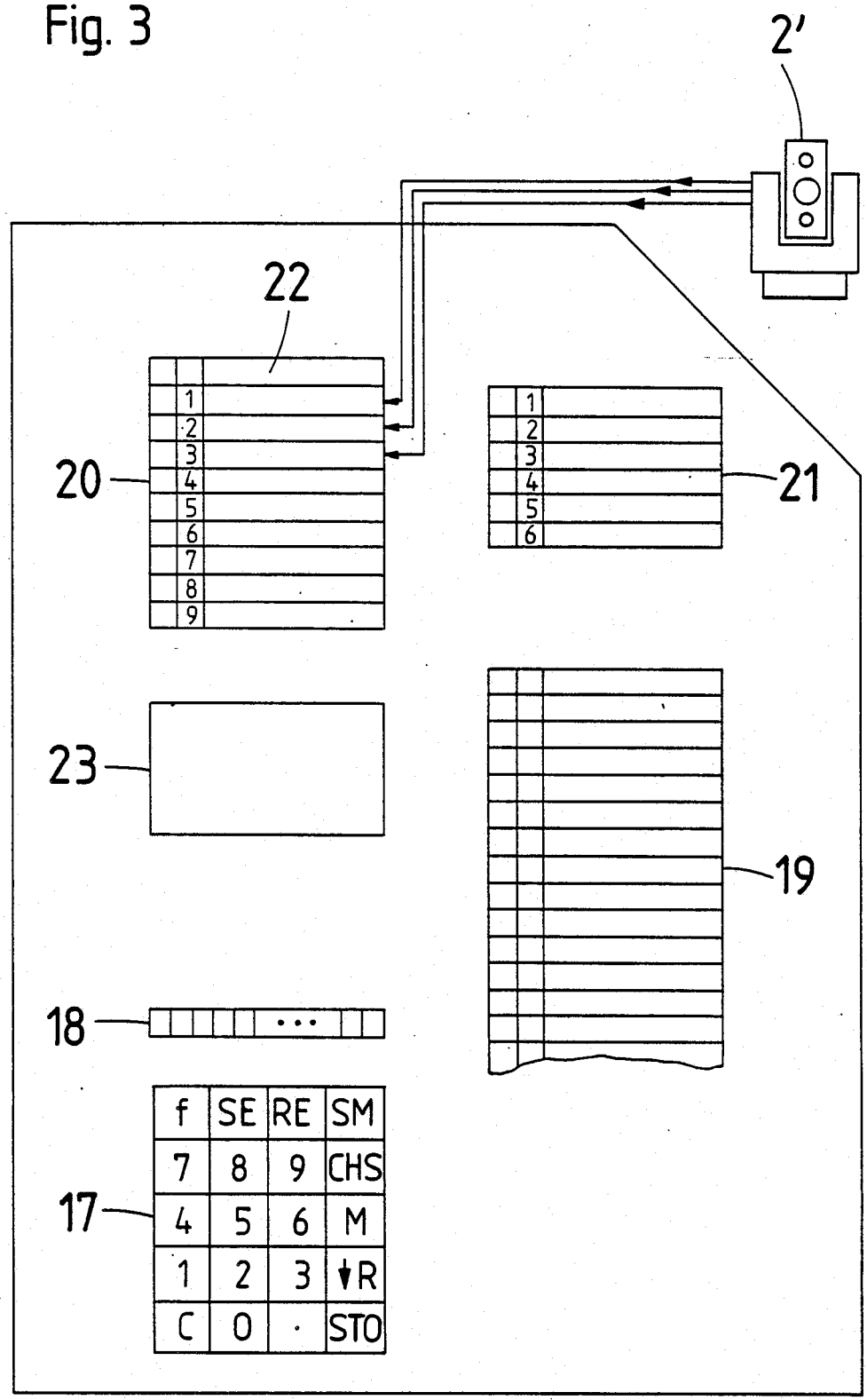
FIG. 3 is a block diagram of storage means according to FIG. 2.

Data modulating and radio frequency transmitting could be made in a conventional way by the transponder shown in FIG. 3 of U.S. Pat. No. 3,680,958 by Von Bose, the entire disclosure of which is incorporated herein by reference. As described in column 3, lines 33-40 of U.S. Pat. No. 3,680,958 the data collected by the remote base line station (200) may be transmitted to the signal processing equipment over the optical beam of source (30a) or may be transmitted over a separate radio frequency transmitter as desired.

The data storage means 3 and the remote station 2' are supplied with power via a cable 5'. As a microcomputer is integrated the semiconductor memory 3 already allows for a limited data management. This comprises, according to the invention, all the steps permitting for the observer the coordination of additional information with the measured value and access to the stored data in the field as well as the steps necessary for taking over the measured values from theodolite and range-finder and for edition of the stored data to the computer.

Data storing and displaying is conventional and could be done with a data terminal M445 of Unilever Computer Services Limited, Micronics Division. The M445 data terminal can receive, display and store data from any electronic data source, as well as from manual input via keyboard.

The data stored in the memory 3 combining measured values with additional information is divided into blocks. One block comprises such data as are stored by a store command. According to the diversity of data to be stored, four different types of data blocks are provided, each comprising up to nine single values. The first values of each type of data block are the values measured by and periodically transmitted from theodolite 1 and range-finder 2. These are cleared by the editing program provided in the memory 3 in all cases where they are not used. The remaining six values of each data block make up the additional information. These are input by means of a keyboard 17 (FIG. 2) and at the same time show up at a display 18 of the storage means 3. With this embodiment each of these six values in all four types of data blocks is specified by a two or three position alphanumeric code which has a mnemonic sense and is displayed at the same time with the respective value.

Prior to being stored, the several input values of each block are in a buffer storage means, the content of which is displayed in a manner known from the stack register of pocket calculators (FIG. 3). After a roll down key is pressed the succeeding number is displayed without change of the order of numbers within the buffer.

For economic use of the memory capacity available a variable word length is provided, as well as elimination of all information that repeats with successive measurements.

The structure of data memory 3 is represented schematically and in detail in FIG. 3. The memory is subdivided into the data memory 19 proper and the two buffers 20, 21. The content of data memory 19 cannot be altered by means of keyboard 17, whereas content of buffer 21 can be changed only by a store command.

Preparation of the data blocks is effected with buffer 20. Values No. 1 to 3 of each block are transmitted automatically from the measuring station at the first survey point. Values No. 4 to 9 are put into buffer 20 by means of keyboard 17; thus they may be arbitrarily changed while in buffer 20. Buffer 20 comprises an additional register 22 which holds the running number of the respective data block. Values No. 1 to 6 of the preceding data block are temporarily stored in buffer 21.

In particular four types of data blocks are provided:

| Code number | Code displayed | meaning of value |
|---|---|---|
| | Data block "MEASURE" | |
| 11 | Hor | horizontal direction |
| 12 | ELE | elevation angle |
| 13 | dIS | oblique distance |
| 14 | Pnr | point number |
| 15 | Pco | point code |
| 16 | SH | height of signal |
| 17 | E-l | eccentricity at target point directed to tachymeter |
| 18 | E-r | eccentricity at target point orthogonal to tachymeter |
| 19 | Add | add 1000 m to oblique distance |
| | Data block "STATION DEFINITION" | |
| 21, 22, 23 | Hor, ELE, dIS | See block "MEASURE" |
| 24 | Snr | station number |
| 25 | Sco | station code |
| 26 | IH | height of instrument |
| 27 | tE | air temperature |
| 28 | Pr | air pressure |
| 29 | | at disposal |
| | Data block "ADMINISTRATION" | |
| 31, 32, 33 | Hor, ELE, dIS | see block "MEASURE" |
| 34 | OP | operators, measurement team |
| 35 | b-E | begin or end of measurement |
| 36 | Pro | project number |
| 37 | dAt | date |
| 38 | t | time |
| 39 | Inr | instrument number |
| | Data block "ERROR" | |
| 41, 42, 43 | Hor, ELE, dIS | see block "MEASURE" |
| 44 | nrC | number of measurement believed to be erroneous, to be treated accordingly by processing program |
| 45 | PnC | number of point believed to be measured in erroneously, to be treated accordingly by processing program |
| 46, 47, 48, 49 | | at disposal |

12 characters are provided for the point number. This number is automatically increased by 1 after each storage. Any number can be introduced at any time as point number by means of the keyboard 17 if this should be desirable.

The point code is used to denote a type of point, independently of the point number. This code may be used advantageously, e.g. for measuring digital terrain models requiring no point numbers.

The begin of a set is denoted by input of a new station definition.

Data storage in memory 19 is controlled by a program stored in a program memory 23 of the microprocessor (microcomputer). This program is initiated by pressing key STO of the keyboard 17. Thereby the differences between buffer 20 and buffer 21 are formed prior to transfer of the content of buffer 20 into memory 19. Only on condition that these differences are not zero, the respective new values are transferred from buffer 20 into memory 19. After this step the values of buffer 20 are transferred into buffer 21 without changing buffer 20 nor paying attention to differences between the buffers, except for the values No. 7 to 9, which are cleared after storage for all types of data blocks. Thus the operator, while scanning a data block in buffer 20 is shure to find zero values for the eccentricities. Each value is automatically preceded by its code (Hor, ELE, etc.) corresponding to the type of data block selected.

The first line of keys of keyboard 17 (FIG. 3) is used for inspection of the stored values. By pressing keys f-SE a search programm is activated. A value keyed in thereafter is sought among the stored values upon pressing key SE. The value is then displayed after it has been spotted. After pressing once more key SE the programm continues the search until the next stored value of the same kind is found.

Upon pressing key SM the value immediately succeeding the one just found in the memory is displayed, and keys f-SM will produce display of the immediately preceding value. Key RE is used to pass from the search program back to the store program.

Selection of each type of data block is effected by pressing one of the key combinations

1 M: "MEASURE"
2 M: "STATION DEFINITION"
3 M: "ADMINISTRATION"
4 M: "ERROR"

Key R is used for successive display of the values No. 4 to 9 from buffer 20. Key CHS, when pressed, changes the arithmetic sign of the value in display, key STO effects storage and key C clearing of the value being displayed.

An electric current is necessary to maintain storage of information within memory 19. Premature expiring of a battery supplying this current and being part of data storage means 3 is prevented by power supply by an external battery via cable 5' (FIG. 2). After completion of measurements power for storage is supplied by a battery integrated into the transport case of data storage means 3.

Various modifications, changes and embodiments have been suggested, others may be obvious to those skilled in the art.

For finding points with known distance and direction it will be an advantage to provide the surveying apparatus according to the invention with a tracking facility. Tracking of information generation, when considered only as one element of a combination, is conventional. It can be done as described in the AGA Geodimeter 700 operating manual of AGA Geotronics AB, Lidingö, Sweden. Thus distance measurement is repeated continuously or tracked, as long as the reflector is within the laser beam. Such a tracking facility may be used as well for setting out or layout of points, defined as transfer of points, aligning bases, angles or heights into the terrain for marking boundaries or for preparation of building sites.

A certain amount of data may be transmitted automatically from the keyboard 17 at one of the second survey points to the measuring station 1, 2 for processing, thereby allowing for a simplified version of storage means 3. Instead of transmitting oblique distance, horizontal distance and elevation difference may already be calculated at the electronic theodolite 1 for subsequent transmission.

Due to the convenient data management, the apparatus lends itself also for cadastral surveying, meaning property surveying and comprising each single surveying operation (cadastral resurvey, boundary survey) the results of which are taken over into land registry.

If passive (cube corner) reflectors are used at the target points, only a small receiver of modest power consumption is necessary for data reception and storage. This disclosure is therefore to be taken as illustrative of the present invention and not limiting thereof.

What is claimed is:

1. A surveying apparatus for measuring the relative position of a first point and at least one second point with
   (a) means (15) at the first point for directional transmission to the second point of modulated electromagnetic waves with a wavelength between 100 um and 0,1 um;
   (b) means (15') at the second points to beam back to the first point said modulated waves;
   (c) means (2) at the first point to obtain from the transmitted and returned waves the distance to the second point;
   (d) means (2) for transmission, by means of modulated electromagnetic waves, of signals representing distance between the points, wherein the improvement comprises:
   (e) means (3, 17) at each second point for digitally storing measured numerical values of said distance and combining these values with additional numerical or alphanumerical information concerning respectively each second point;
   (f) means for separate transmission of signals representing distance or directional information between the points by means of electromagnetic waves with a wavelength between 5 m and 15 m; and
   (g) a separate data storage means coordinated with each of the second points, this storage means being activated for storage of the signals representing distance or directional information and transmitted separately, by reception of said waves serving for distance measurement and being directed from the first point to the second point corresponding to the respective storage means.

2. A surveying apparatus for measuring the relative position of a first point and at least one second point with
   (a) means (1) at the first point for measuring horizontal direction or elevation angle of the second point;
   (b) means (2, 2') for transmission, by means of modulated electromagnetic waves, of signals representing said directional data between the points, wherein the improvements comprises:
   (c) means (3) at each second point for digitally storing measured numerical values of the directional data and combining these values with additional numerical or alphanumerical information concerning respectively each second point;
   (d) means for separate transmission of signals representing distance or directional information between the points by means of electromagnetic waves with a wavelength between 5 m and 15 m; and
   (e) a separate data storage means coordinated with each of the second points, this storage means being activated for storage of the signals representing distance or directional information and transmitted separately, by reception of said waves serving for distance measurement and being directed from the first point to the second point corresponding to the respective storage means.

3. A surveying apparatus for measuring the relative position of a first point and at least one second point with
   (a) means (15) at the first point for directional transmission to the second point of modulated electromagnetic waves with a wavelength between 100 um and 0,1 um;

(b) means (15') at the second point to beam back to the first point said modulated waves;

(c) means (2) at the first point to obtain from the transmitted and returned waves the distance to the second point;

(d) means (2) for transmission, by means of modulated electromagnetic waves, of signal representing distance between the points, wherein the improvement comprises:

(e) means (3, 17) at each second point for digitally storing measured numerical values of said distance and combining these values with additional numerical or alphanumerical information concerning respectively each second point, (f) both means (2, 1) for distance and directional measurement at the first point and means for transmission of the distance and directional information between the points by modulating upon the electromagnetic waves serving for distance measurement;

(g) means for automatic transmission of signals representing distance and directional information and means for automatic combination of this information with additional information for automatic storage; and (h) means for automatically tracking generation, transmission and storage of information during changes of distance between first and second point.

4. A surveying apparatus for measuring the relative position of a first point and at least one second point with (a) means (15) at the first point for directional transmission to the second point of modulated electromagnetic waves with a wavelength between 100 um and 0,1 um;

(b) means (15') at the second points to beam back to the first point said modulated waves;

(c) means (2) at the first point to obtain from the transmitted and returned waves the distance to the second point;

(d) means (2) for transmission, by means of modulated electromagnetic waves, of signals representing distance between the points, wherein the improvement comprises (e) means (3, 17) at each second point for digitally storing measured numerical values of said distance and combining these values with additional numerical or alphanumerical information concerning respectively each second point;

(f) wherein the means (2) for transmission between the points of signals representing distance comprise means (2) at the first point for modulating upon the electromagnetic waves serving for distance measurement, the signals representing distance;

(g) both means (2, 1) for distance and directional measurement at the first point and means for transmission of the distance and directional information between the points by modulating upon the electromagnetic waves serving for distance measurement;

(h) means for automatic transmission of signals representing distance and directional information and means for automatic combination of this information with additional information for automatic storage; and (i) means for automatically tracking generation, transmission and storage of information during changes of distance between first and second point.

5. A surveying apparatus for measuring the relative position of a first point and at least one second point with (a) means (1) at the first point for measuring horizontal direction or elevation angle of the second point;

(b) means (2, 2') for transmission, by means of modulated electromagnetic waves, of signals representing said directional data between the points, wherein the improvements comprises:

(c) means (3) at each second point for digitally storing measured numerical values of the directional data and combining these values with additional numerical or alphanumerical information concerning respectively each second point;

(d) both means (2, 1) for distance and directional measurement at the first point and means for transmission of the distance and directional information between the points by modulating upon the electromagnetic waves serving for distance measurement;

(e) means for automatic transmission of signals representing distance and directional information and means for automatic combination of this information with additional information for automatic storage; and (f) means for automatically tracking generation, transmission and storage of information during changes of distance between first and second point.

6. A surveying apparatus for measuring the relative position of a first point and at least one second point with (a) means (15) at the first point for directional transmission to the second point of modulated electromagnetic waves with a wavelength between 100 um and 0,1 um;

(b) means (15') at the second point to beam back to the first point said modulated waves;

(c) means (2) at the first point to obtain from the transmitted and returned waves the distance to the second point;

(d) means (2) for transmission, by means of modulated electromagnetic waves, of signal representing distance between the points, wherein the improvement comprises:

(e) means (3, 17) at each second point for digitally storing measured numerical values of said distance and combining these values with additional numerical or alphanumerical information concerning respectively each second point;

(f) wherein the means (2) for transmission between the points of signals representing distance comprise means (2) at the first point for modulating upon the electromagnetic waves serving for distance measurement, the signals representing distance;

(g) wherein the means (2) for transmission between the points of signals representing distance comprise means (2') at the second point for transmission of the received signals representing distance back to the first point by modulating them upon the electromagnetic waves beamed back to the first point;

(h) both means (2, 1) for distance and directional measurement at the first point and means for transmission of the distance and directional information between the points by modulating upon the electromagnetic waves serving for distance measurement;
(i) means for automatic transmission of signals representing distance and directional information and means for automatic combination of this information with additional information for automatic storage; and
(j) means for automatically tracking generation, transmission and storage of information during changes of distance between first and second point.

* * * * *